United States Patent Office 3,793,429
Patented Feb. 19, 1974

3,793,429
NITRIC ACID PROCESS FOR RECOVERING METAL VALUES FROM SULFIDE ORE MATERIALS CONTAINING IRON SULFIDES
Paul B. Queneau and John D. Prater, Salt Lake City, Utah, assignors to Kennecott Copper Corporation, New York, N.Y.
Filed Feb. 18, 1972, Ser. No. 227,588
Int. Cl. C22b 3/00
U.S. Cl. 423—34
16 Claims

ABSTRACT OF THE DISCLOSURE

A sulfide ore material containing sulfide iron and values of one or more metals in the group consisting of copper, nickel, cobalt and silver, is subjected to leaching with an aqueous solution of nitric acid under conditions controlled to insure the formation of easily filterable hydrogen jarosite ($3Fe_2O_3 \cdot SO_3 \cdot 4SO_3 \cdot 9H_3O$), or a similar but less desirable iron compound ($2Fe_2O_3 \cdot SO_3 \cdot 5H_2O$), which is precipitated. Elemental sulfur is formed and leaves the leach system, along with the precipitated iron values and unreacted sulfide minerals, in the filter cake. Unreacted sulfide minerals are easily separated from the other solids by conventional froth flotation after removal of the elemental sulfur, and are recycled to the leach system.

BACKGROUND OF THE INVENTION

Figure 1:
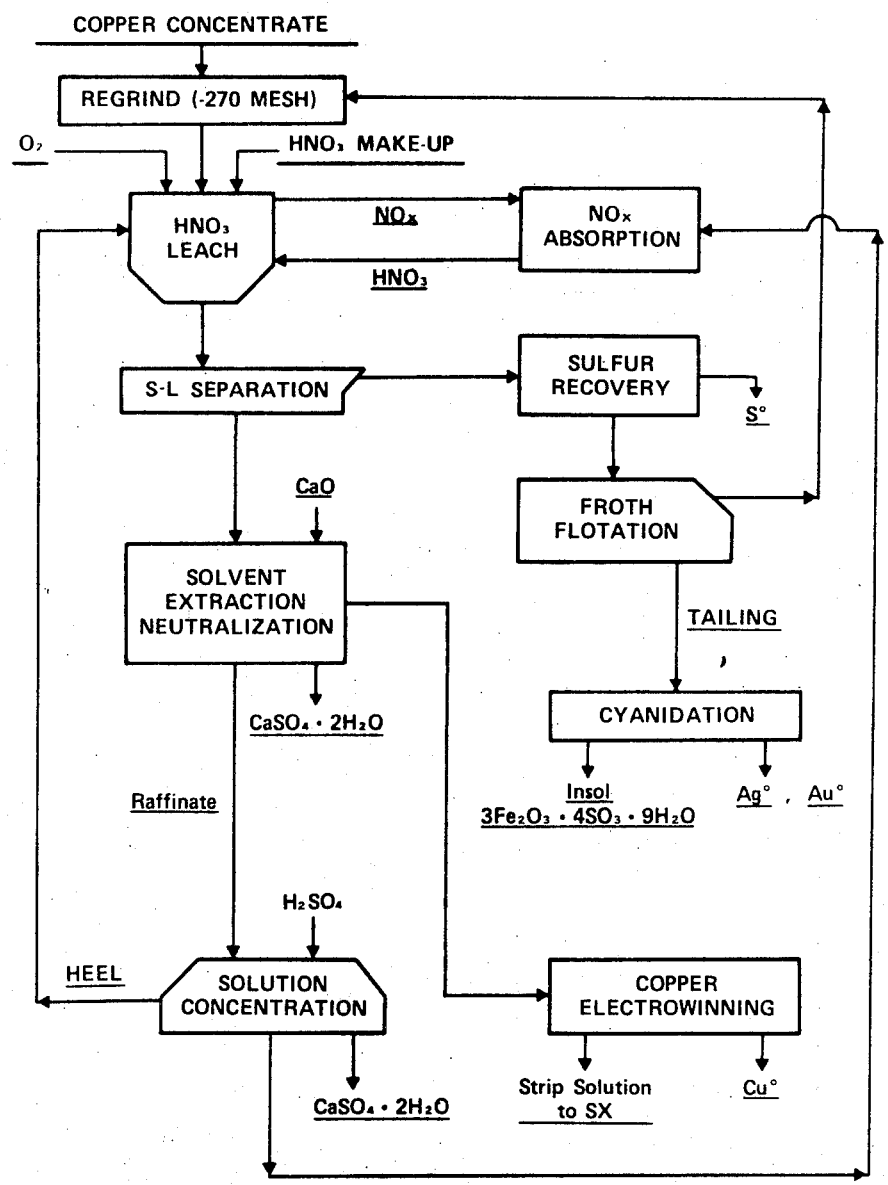

Field.—The invention is in the hydrometallurgical field of leaching sulfide ore materials with nitric acid for the recovery of various metal values while rejecting iron and sulfur values.

State of the art.—The use of nitric acid as a lixiviant for ore materials has long intrigued the metallurgical art, but has never been adopted commercially to any significant extent for several reasons. Although the greater cost and corrosiveness of nitric acid as compared to sulfuric acid have been reasons, for commercial avoidance of nitric acid processes the most important reason has been the difficulty of processing the refractory, higher sulfide minerals, such as chalcopyrite and bornite, while rejecting iron and forming elemental sulfur. Another significant reason has been the fact that it has been difficult to utilize the relatively expensive nitric acid reagent efficiently and to achieve reasonable leaching rates.

The closest approach heretofore to a practical nitric acid leaching process is described by G. Bjorling and G. A. Kolta of the Royal Institute of Technology, Stockholm, Sweden, in a technical paper published in 1965 along with other technical papers in a book entitled "Proceedings of the International Mineral Processing Congress 1964," vol. I, pp. 127–138. Such a process, however, is applicable to refractory, higher sulfide minerals only after they have been decomposed by prior heat treatment. Moreover, the iron sulfides in the ore material being treated are rejected as ferric hydroxide, which makes difficult the achievements of efficient liquid-solid separation without special pre-treatment.

SUMMARY OF THE INVENTION

In accordance with the invention, a quantity of the ore material to be processed is subjected to the leaching action of an aqueous solution of nitric acid.

It is the purpose of the invention to convert the iron sulfide values in the feed ore material to an iron compound which is easily filtered from the pregnant solution, without special pre-conditioning as by autoclaving at a temperature of 120° C. or higher, and which is amenable thereafter to separation from excess unreacted sulfide minerals by conventional froth flotation. We have found that by properly controlling the nitric acid leach, the iron sulfide values in the feed ore material can be converted to hydrogen jarosite ($3Fe_2O_3 \cdot 4SO_3 \cdot 9H_2O$) or in a similar but somewhat less desirable iron compound form ($2Fe_2O_3 \cdot SO_3 \cdot 5H_2O$), both of which are easily filtered from the solution. The solids resulting from the filtration can be effectively treated by conventional froth flotation, following removal therefrom of elemental sulfur, to separate the unreacted metal sulfides from the jarosite or the other iron compound precipitate. Other liquid-solid separation methods can replace filtration.

Control of the nitric acid leach is primarily with respect to the relative quantities of ore material and nitric acid. Thus, in order to insure the formation of the jarosite or the similar iron compound, it is essential that enough of the nitric acid be consumed by the ore material to cause the pH of the pregnant leach solution to rise from a pH of less than 0.5 during the course of the leaching operation through pH 0.5, as the nitric acid is consumed, to a pH short of that which would cause hydrolysis of the metal value or values to be recovered.

It is preferable that the nitric acid leach solution be slowly poured into an aqueous slurry of the ore material, so that the nitric acid concentration in the slurry never exceeds 20% of the weight of the solution, and that the leaching continues thereafter for a sufficient time for the pH to rise as above stated.

Upon completion of the leach reaction, determined by cessation of gas evolution and precipitation of iron, the resulting slurry is filtered. The filtrate, typically containing only about three grams per liter of iron values, is processed by conventional procedures such as solvent extraction and/or electrowinning for the recovery of the contained metal values. The filter cake, containing gangue materials, the iron precipitate, elemental sulfur, unreacted sulfide minerals, and various values inert to nitric acid, is treated for the recovery of elemental sulfur by well known procedures such as leaching with an organic solvent, and is then subjected to conventional froth flotation for the separation therefrom of the unreacted sulfide minerals, which are recycled to the leaching stage of the process. The flotation tailings are treated for the recovery of various values contained therein, for example by cyanidation for the recovery of gold and unsolubilized silver.

Conducting the nitric acid leach at elevated temperature, e.g. 90° to 95° C., facilitates formation of the jarosite or the similar iron compound. Also, it may increase the yield of elemental sulfur, depending upon acid strength in the slurry during the acid-addition portion of the leach. A high solid to liquid ratio, e.g. 33% to 50% by weight solids in the slurry, is also advantageous to efficient rejection of iron.

The formation of jarosite as against the similar but less desirable iron compound mentioned previously is dependent upon the amount of sulfate present in the leach liquor at the time of iron precipitation. Insufficient sulfate results in either the formation of the less desirable iron compound or of a wholly undesirable iron compound, such as goethite, $FeO(OH)$. Sufficent sulfate to meet the stoichiometric requirement for jarosite formation will usually be present in the pregnant leach solution due to some oxidation of sulfide sulfur and elemental sulfur. This can be determined by chemical or physical identification of the iron precipitate following trial runs in the laboratory and by analysis of the pregnant leach liquor for sulfate ion. Insufficient sulfate is indicated by less than 10 grams per liter of sulfate in the pregnant solution and by the presence of an undesirable iron compound in the residue solids. An iron compound having a low molar ratio of sulfur to iron as compared with jarosite is undesirable.

If sufficient sulfate is not obtainable from the ore material itself, it should be added at the beginning of the leach period, as for example by the addition of sulfuric acid.

If alkaline earth metal values or the ammonium ion are present in the leach solution during jarosite formation, such other ions may substitute into the lattice of the jarosite structure and form compounds such as sodium jarosite, potassium jarosite, and ammonium jarosite. These jarosite compounds are as effective for purposes of the invention as is hydrogen jarosite.

THE DRAWINGS

Figure 2:
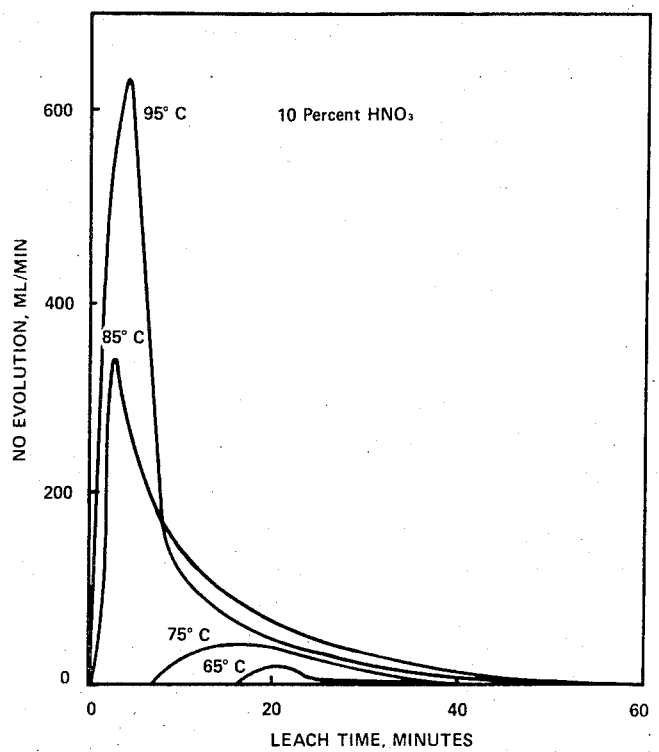
Figure 3:
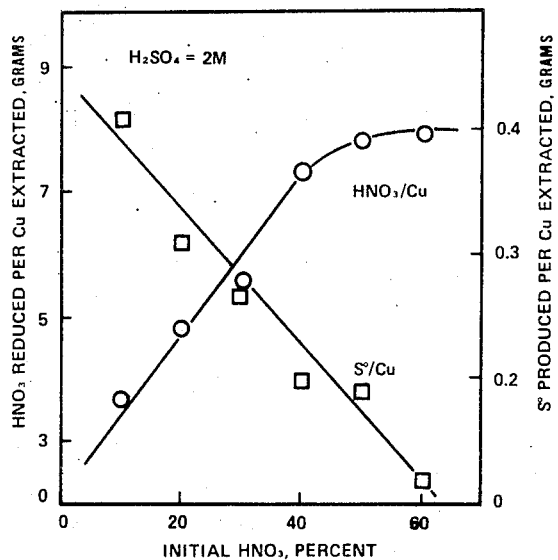
Figure 4:
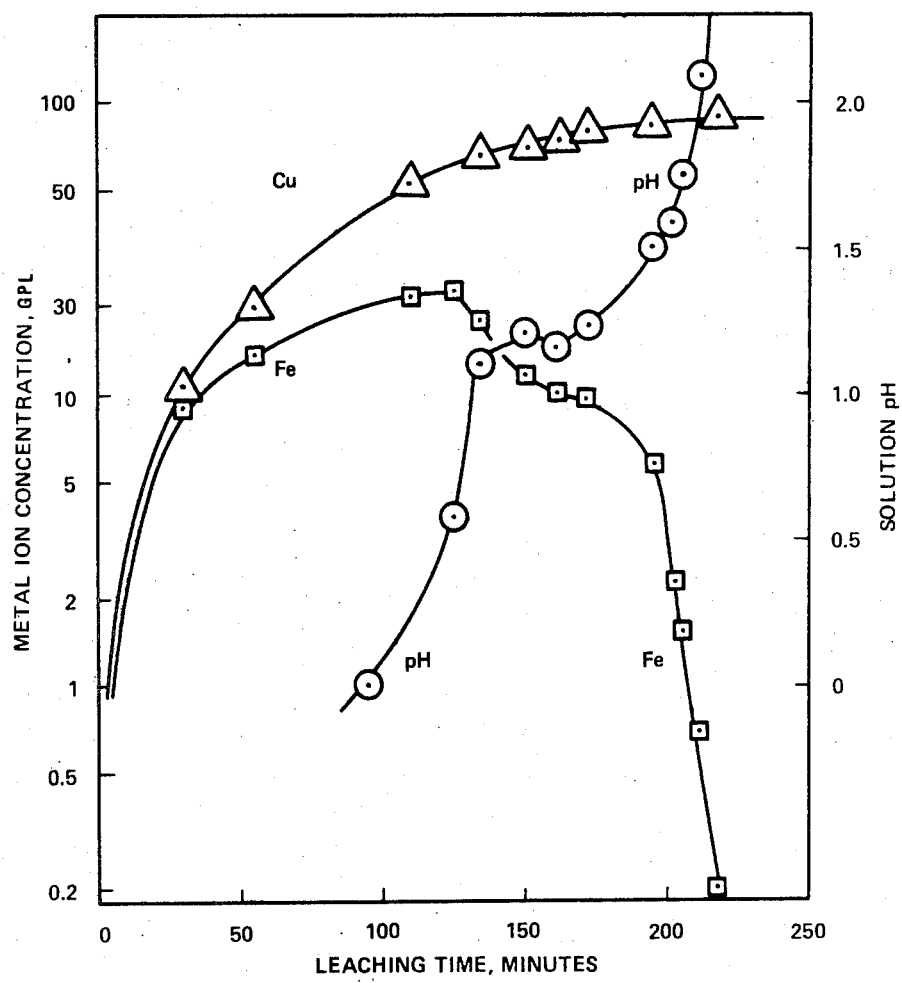
Figure 5:
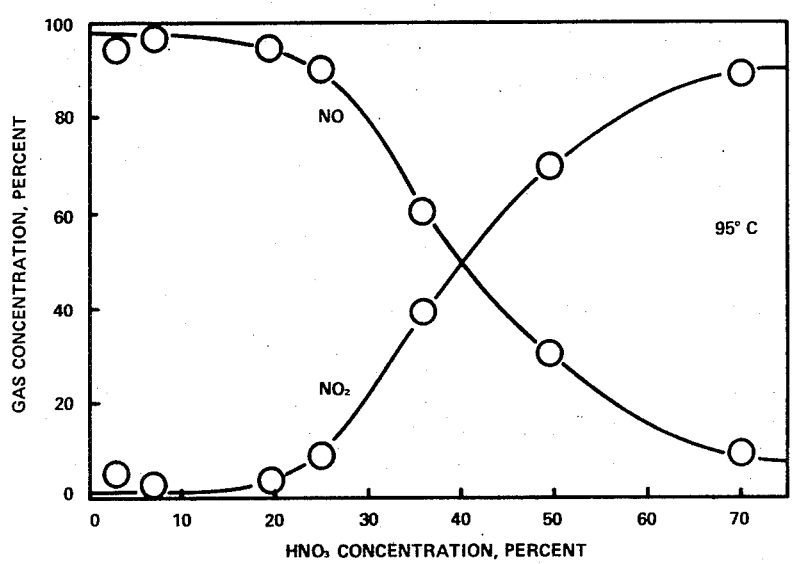
Figure 6:
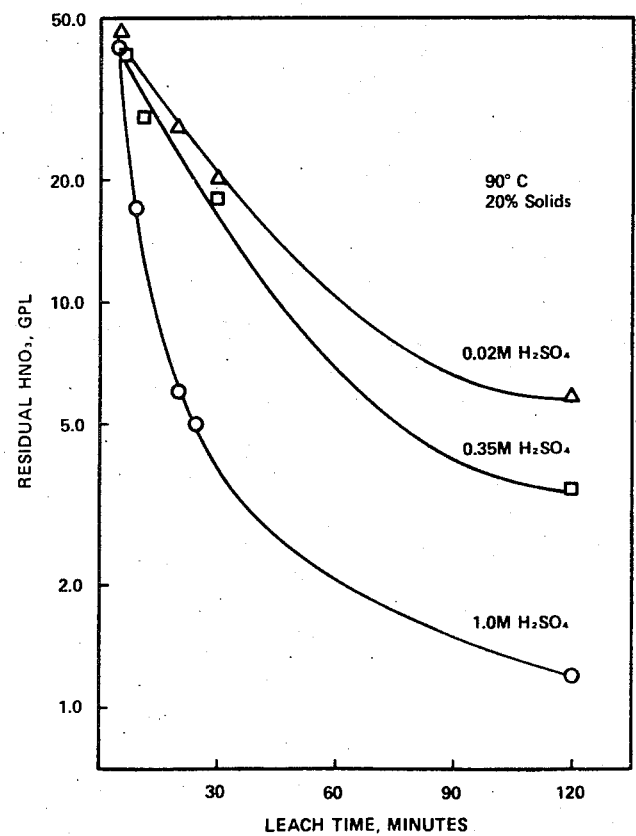

The best mode presently contemplated of carrying out the invention is illustrated in the accompanying drawings, in which:

FIG. 1 is a flow sheet illustrating preferred procedures applied to the processing of a copper sulfide concentrate;

FIG. 2, a graph showing the nitric oxide evolution rate in a nitric acid leach of copper sulfide concentrate corresponding to the typical feed noted for the process of FIG. 1;

FIG. 3, a graph showing nitric acid consumption and elemental sulfur yield as a function of initial nitric acid concentration while leaching corresponding copper sulfide concentrate at 95° C.;

FIG. 4, a graph showing metal ion concentration and pH as a function of time in the nitric acid leaching of corresponding copper sulfide concentrate;

FIG. 5, a graph showing distribution of NO and $NO_2$ as a function of $HNO_3$ concentration while leaching corresponding copper sulfide concentrate; and FIG. 6, a graph showing residual $HNO_3$ as a function of leaching time and residual free $H_2SO_4$ after leaching a stoichiometric excess of corresponding copper sulfide concentrate.

DETAILED DESCRIPTION OF ILLUSTRATED EMBODIMENT

An ideal leach would extract all of the copper, precipitate all of the iron, convert all the sulfide to S°, and consume all of the nitrate added. Unfortunately, the chemistry of the $HNO_3$ leach system does not permit the simultaneous achievement of such ideal results. The conditions most nearly meeting these ends are the addition of oxygen and a deficiency of $HNO_3$ to a slurry of copper concentrate in the manner shown in FIG. 1. Present in such a slurry are fresh concentrate, recycled leach residue, and a solvent extraction raffinate.

In a typical example, a copper sulfide concentrate assaying 28 percent Cu, 25 percent Fe, 31 percent S, 0.29 percent Mo, 3.5 oz Ag/ton, and 0.4 oz Au/ton, the major mineral constituents being chalcopyrite (60 percent), bornite (10 percent), gangue (14 percent), and pyrite (10 percent), was leached at 90° C. over a period of one and a half hours. Nitric acid in the amount of 1.6 pounds for each pound of copper to be oxidized was added continuously over this time period. The continuous addition of $HNO_3$ as a 50 percent solution avoids excessive acid concentration at any time during the leach. One-half hour after completing this addition, the slurry temperature was raised to the incipient boiling point and the oxidation was allowed to continue for the next two hours. During this time, the pH increased and hydrogen jarosite precipitated, as indicated by the graph of FIG. 4. Concentrate, acid, and raffinate were fed continuously to a first leach tank; the slurry was then passed through subsequent leach tanks until oxidation ceased and hydrogen jarosite precipitated.

Both the fresh concentrate and the recycled residue were ground to minus 270 mesh to minimize leach retention time. Gas product dilution was avoided by using pure oxygen rather than air, the oxygen being injected above the slurry rather than in the slurry to minimize frothing. No oxygen was injected above the last leach tank, so that residual nitrate would be consumed. One-half of the NO evolved was converted to $HNO_3$ in condensers (not indicated) superimposed above the respective leach tanks. The $HNO_3$ dripped back into the leach tanks.

The gas evolved from the leach was almost entirely NO and water vapor; the $NO_2$ content averaged two percent and the $N_2O$ one percent. The $NO_2$ content increased as injected oxygen reacted with the NO. The $NO_x$ gas mixture was contacted with cool water in the presence of oxygen to regenerate the $HNO_3$.

It is preferred that the nitric acid supplied to the leach have a concentration of 50 percent by weight $HNO_3$. This acid is made as an incident of the process by contacting the $NO_x$ gases evolved from the leach as indicated above. The water used in the gas absorption step is obtained by partial evaporation of the solvent extraction raffinate.

Six cycles of testing in accordance with the flowsheet of FIG. 1 were completed in the laboratory. In each cycle, 80 percent of the copper and iron was solubilized. Ninety percent of the solubilized iron subsequently precipitated into the leach residue as hydrogen jarosite. Sixty percent of the sulfide sulfur oxidized during the leach was converted to S°. Two-thirds of the remaining sulfur precipitated with the iron as hydrogen jarosite, and one-third was precipitated from the solvent extraction raffinate with lime. The $HNO_3$ leach residue assayed 5.6 percent Cu, 25 percent Fe, and 14 percent S°. After removal of the S°, 95 percent of the contained copper was recovered in a flotation concentrate at 20 percent grade; hydrogen jarosite rejection into the tails was 90 percent.

Cyanidation of the flotation tails for 24 hours at 20 percent solids solubilized 80 percent of the gold and 10 percent of the silver. Consumption of NaCN and CaO were 5 lb. and 22 lb. per ton of feed, respectively. The low extraction of silver probably resulted from its presence as the refractory telluride. Six cycles of testing the flow sheet were not sufficient to bring the circulating load of gold into equilibrium; the gold in the recycled concentrate had reached 1.8 oz/ton and was still increasing.

The filtrate from the leach step contained 50 g. Cu/1, 3 g. Fe/1, 57 g. $NO_3^-$/1, and 52 g. $SO_4^=$/1 after six cycles of testing. None of the gold was solubilized; silver solubilization was less than 10 percent. This filtrate was fed directly to solvent extraction. Lime addition (0.8 pound per pound of copper) during solvent extraction was necessary to neutralize the acid generated as the copper was extracted. The solvent extraction raffinate, which contained 4 g. Cu/1, was boiled to supply condensate both for the $NO_x$ absorption column and for filter cake washing. Water balance required that the raffinate volume be reduced by about one-third. Enough sulfuric acid (0.5 pound per pound copper fed to the leach) was later added to the heel to precipitate residual calcium and to satisfy leach requirements. Excessive calcium in the leach feed must be avoided because the gypsum formed substantially lowers the recovery of copper during the flotation step. The nitrate-containing heel is recycled to leaching.

This procedure resulted in a 98 percent recovery of copper. The two sources of copper loss were the flotation tailings (1 percent) and the gypsum precipitate (1 percent). Gold and silver recoveries were 80 and 10 percent, respectively.

Several reactions that are important in the nitric acid process proceed simultaneously. The first is the oxidation of sulfide sulfur to S°, with the formation of soluble copper and iron salts. In a second reaction, the S° is oxidized to sulfate. Some sulfate is formed directly from the sulfide without any apparent S° intermediate. Another significant reaction involves the neutralization of $H_2SO_4$ by the continued formation of copper and iron salts. When most of the free acid has been consumed, the ferric sulfate hydrolyzes and precipitates from solution as hydrogen jarosite. In an idealized situation, the reactions may be summarized as follows:

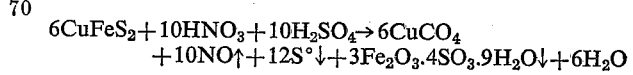
$6CuFeS_2 + 10HNO_3 + 10H_2SO_4 \rightarrow 6CuCO_4$
$+ 10NO\uparrow + 12S°\downarrow + 3Fe_2O_3.4SO_3.9H_2O\downarrow + 6H_2O$ However, the concentrate cannot be oxidized completely to yield the products shown; some copper nitrate is formed and small quantities of acid and ferric salts remain in solution. Depending on the leaching conditions, part of the S° may be oxidized to sulfate, and $NO_2$ may be evolved instead of NO.

A primary goal of most metallurgical processes is high extraction of the metal values from the feed material. In the $HNO_3$ leaching system, acid concentration, mineral type, particle size, temperature, and time are all important factors in achieving this goal.

The rate at which $NO_x$ gases are evolved from the leach is an indication of the rate of metal oxidation. FIG. 2 shows the effect of temperature on NO evolution rate as a function of time; increased temperature markedly accelerates the rate at which copper-iron sulfides are oxidized by $HNO_3$. Addition of $H_2SO_4$ to the leach liquor has a similar effect.

The effect of $HNO_3$ concentration, mineral type, and particle size on metal extraction was studied. Higher metal extractions were obtained consistently with higher nitric acid concentrations in tests that were run at very low percent solids so that acid concentration would remain almost constant, see Table I below:

TABLE I.—EXTRACTION OF METAL VALUES FROM TYPICAL COPPER SULFIDE CONCENTRATE NOTED

| $HNO_3$ concentration, percent | Extraction, percent | | |
|---|---|---|---|
| | Cu | Mo | Ag |
| 63 | 99.0 | 94.5 | 66.2 |
| 50 | 99.8 | 96.6 | 53.0 |
| 35 | 97.9 | 96.6 | 51.0 |
| 25 | 83.9 | 87.9 | 18.6 |
| 13 | 72.9 | 58.8 | 17.8 |

Tetrahedrite was the most easily oxidized mineral tested, chalcopyrite the least. The data shown in Table II, below, were obtained at 90° C. while leaching for one hour with an excess of 20 percent $HNO_3$ and without addition of $H_2SO_4$. The rate of copper extraction increased with decreasing particle size.

TABLE II.—RELATIVE REACTIVITY AND ELEMENTAL SULFUR YIELD OF PURE MINERALS LEACHED WITH NITRIC ACID

| Mineral | Relative reactivity | Elemental sulfur yield, percent |
|---|---|---|
| $Cu_3SbS_3$ | 10 | 40 |
| $Cu_2S$ | 8 | 75 |
| FeS | 7 | 60 |
| $FeS_2$ | 7 | 3 |
| $Cu_9S_5$ | 6 | 55 |
| CuS | 6 | 50 |
| $Cu_5FeS_4$ | 5 | 60 |
| $CuFeS_2$ | 2 | 45 |

The most desirable sulfur product from sulfide leach systems is usally S°. It is relatively inert, easy to dispose of or stockpile, and its presence indicates efficient utilization of the oxidant. Thus, the maximization of S° yield was an important goal. It is believed that the net yield of S° is a function of two reactions. The first reaction, which must be maximized, is the formation of S°. The second reaction, which must be minimized, is the oxidation of S° to sulfate. Data in Table III, below, show that the formation of S° rather than sulfate is promoted by increasing either the leach temperature of the $HNO_3$ concentration when a definciency of $HNO_3$ is present.

TABLE III.—EFFECT OF TEMPERATURE AND CONCENTRATION ON ELEMENTAL SULFUR FORMATION [1]

| Initial $HNO_3$ concentration, percent | Temperature, °C. | Initial $H_2SO_4$ concentration, molarity | Grams S° yield per gram copper extracted |
|---|---|---|---|
| 20 | 75 | 0.25 | 0.33 |
| 20 | 95 | .25 | .44 |
| 20 | 75 | 1.0 | .26 |
| 20 | 95 | 1.0 | .41 |
| 60 | 75 | .25 | .40 |
| 60 | 75 | 1.0 | .38 |

[1] Leach time, two hours; Initial $HNO_3/Cu$, 4.1.

On the other hand, overall S° yield is decreased with increased $H_2SO_4$ concentration. Unfortunately, the oxidation of S° is also accelerated by increasing either leaching temperature or $HNO_3$ concentration. These effects are shown in Table IV, below. Here, reagent grade S° was leached to isolate the factors affecting its rate of oxidation.

TABLE IV.—RESULTS OF $HNO_3$—$H_2SO_4$—$H_2O$ INTERACTION WITH ELEMENTAL SULFUR [1]

| Nitric acid, percent | Temperature, °C. | Elemental sulfur oxidation, percent |
|---|---|---|
| 60 | 95 | 16.4 |
| 60 | 75 | 8.7 |
| 20 | 95 | 2.5 |
| 20 | 75 | 2.4 |

[1] $H_2SO_4$ molarity, 1.0 M; Leach time, two hours; $HNO_3/S°$, 6.

The graph of FIG. 3 further illustrates the interaction of S° with excess $HNO_3$; the decrease in S° yield with increasing $HNO_3$ concentration is believed due to the S° oxidation reaction overwhelming the S° formation reaction as acid concentration was increased. In FIG. 3, the initial $HNO_3/Cu$ weight ratio was 8.4.

Elemental sulfur yield is also dependent on the mineralogy of the feed. As shown in Table II, $Cu_2S$, $Cu_5FeSu_4$, and FeS give the best S° yields. Pyrite gives an unusually low sulfur yield, making it a poor choice for nitration. Excessive sulfate would be generated, and a disproportionate quantity of $HNO_3$ would be consumed. It should be noted that the sulfur yields shown in Table II are not maximum yields and are included only to illustrate the relative sulfur-forming tendency of the minerals.

A problem common to most processes recovering copper from sulfide ores is the rejection of iron. Previous investigators of the nitric acid system utilized iron hydroxide precipitation to accomplish this end; however, this precipitate is difficult to filter and causes sliming problems during flotation. It was found that proper adjustment of leaching conditions resulted in the precpitation of $3Fe_2O_3 \cdot 4SO_3 \cdot 9H_2O$ (hydrogen jarosite). This precipitate is crystalline, readily filterable, and does not entrain copper.

Hydrogen jarosite precipitation is optimized by high pH, high temperature, high percent solids, and reasonably high sulfate concentration. The relationship between leach liquor pH and iron concentration is shown in FIG. 4. The rise in pH is caused by the gradual consumption of $HNO_3$ and $H_2SO_4$ as shown in the following equation:

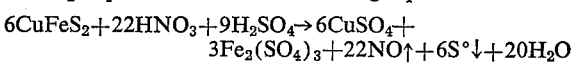

This pH rise will effectively precipitate $3Fe_2O_3 \cdot 4SO_3 \cdot 9H_2O$ if the leachant is both hot and at high percent solids as shown in the following equation:

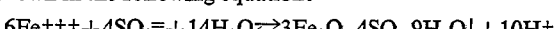

Because the hydrogen jarosite precipitation generates additional acid, the pH rise halts briefly until the reaction consumes this new acid supply. This pH rest has been observed between pH 0.5 and 1.5.

Rejection of iron during leach is enhanced by increasing the leach temperature. Leaching an excess of the typical concentrate previously noted at a temperature of 95° C. with $HNO_3$ under conditions conducive to hydrogen jarosite formation resulted in an 85 percent rejection of iron. Leaching at 75° C. under otherwise identical conditions resulted in only 62 percent iron rejection. The copper extraction was almost identical in both tests.

High percent solids results in high metal loading of the leach liquor which maximizes the rejection of

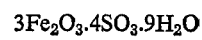

from solution. This effect is shown in Table V, below, at two levels of sulfuric acid concentration. In each test, sufficient acid was present or generated to supply the requirement for hydrogen jarosite. If insufficient sulfate is available in the leach solution, then $2Fe_2O_3 \cdot SO_2 \cdot 5H_2O$ forms instead. Severe sulfate depletion results in precipitation of FeO(OH).

TABLE V.—EFFECT OF PERCENT SOLIDS ON IRON REJECTION [1]

| Percent solids | Initial $H_2SO_4$ molarity | Percent of solubilized Iron precipitated | Copper extraction, percent |
|---|---|---|---|
| 33 | 0.25 M | 83 | 71 |
| 14 | .25 M | 2 | 67 |
| 33 | 1.0 M | 27 | 71 |
| 14 | 1.0 M | 0 | 75 |

[1] Leach temperature, 95° C; Leach time, two hours.

The economics of hydrometallurgical processes are closely tied to efficient utilization of reagents. Reagent consumption in the $HNO_3$ leaching system is highly dependent on experimental conditions. High reagent consumption was traced to two principal causes: (1) production of $NO_2$ rather than NO gas, and (2) oxidation of sulfides to sulfates rather than to S°.

The importance of producing NO gas rather than $NO_2$ can be seen from the following equations:

$$3CuS + 2HNO_3 + 3H_2SO_4 \rightarrow 3CuSO_4 + 3S° + 2NO\uparrow + 4H_2O$$

$$CuS + 2HNO_3 + H_2SO_4 \rightarrow CuSO_4 + S° + 2NO\uparrow + 2H_2O$$

Using the same amount of nitric acid, three times as much copper can be extracted when NO is the reaction product. Acid concentration is the most important factor in determining which gas is evolved. FIG. 5 shows the composition of the off-gas as a function of $HNO_3$ concentration. Below 25 percent $HNO_3$, nearly pure NO was produced; at 70 percent $HNO_3$, the off-gas was 90 percent $NO_2$. The presence of $H_2SO_4$ has a similar but less intense effect on the $NO/NO_2$ ratio. One percent $N_2O$ was also evolved from the leach at 95° C.; this assay increased to 3 percent at 75° C. The effect of acid concentration on the $N_2O$ analysis was small. Nitric acid would be utilized most efficiently if $N_2O$ gas was the reduced product; however, since $N_2O$ cannot be converted to $HNO_3$ by conventional technology, any $N_2O$ produced must be considered a process loss.

Oxidation of the sulfides to S° rather than sulfate represents approximately a four-fold savings in reagent required. Elemental sulfur oxidation is favored by high acid concentration. Thus, highly concentrated acid reduces acid efficiency both by increased $NO_2$ production and by oxidizing S°. FIG. 3 illustrates the wide range of $HNO_3$ consumption and S° oxidation encountered over the acid concentration range tested. Decreasing the $HNO_3$ concentration from 50 to 20 percent cut $HNO_3$ consumption in half while doubling the yield of S°.

A portion of the nitric acid fed to the leach is not consumed, even when a large excess of concentrate is present. Increasing the concentration of free $H_2SO_4$ will decrease the residual nitrate concentration. FIG. 6 shows the relationship between leaching time, $H_2SO_4$ concentration, and residual nitrate concentration. To reduce the nitrate level to less than 2 grams/liter while leaching an excess of concentrate, a 2-hour leach at 90° C. in the presence of 1.0 M free $H_2SO_4$ was required. Oxygen hinders nitrate removal in that is enables some regeneration of $HNO_3$ in the condenser as shown in the following equations:

$$2NO + O_2 \rightarrow 2NO_2$$

$$3NO_2 + H_2O \rightarrow 2HNO_3 + NO$$

The nitric acid process will also work effectively if the pressure over the leach slurry is increased. Higher pressure has the following effects:

1. The reaction temperature can be increased above the normal boiling point of the leach liquor. This increased temperature results in:
   a. More rapid oxidation of the minerals
   b. More rapid formation of hydrogen jarosite
   c. Improved elemental sulfur formation, but more rapid elemental sulfur oxidation
   d. Lower residual nitrate concentration
2. Higher overpressures of oxygen gas results in increased internal regeneration of $NO_x$ product gases to nitric acid.

The magnitude of the overpressure is dictated by economics. Two atmospheres are sufficient to obtain the effects listed above. Elevation of the leach pulp to above the melting point of monoclinic elemental sulfur (117–119° C.) is not advisable during the leach in that the mineral particles become coated. A brief heat after the leach may be advantageous both to coagulate the elemental sulfur and to complete the iron hydrolysis to hydrogen jarosite.

Reverting to a further consideration of leaching under atmospheric pressure, it should be realized that different minerals leach at different rates and that the initial or nitric acid reaction part of the total leach period will vary in duration, depending upon the particular minerals concerned. Thus, chalcopyrite and bornite are very refractory and will require a reaction period of about two hours, while tetrahidrite and chalcocite are relatively reactive and are easily oxidized, requiring a reaction period of only about one hour. Nitric acid will normally be added throughout only an initial portion of the nitric acid reaction period, usually about one-third of the total leach period. As previously indicated, the leach slurry is heated to an elevated temperature, e.g. the boiling point, following the nitric acid reaction. This facilitates jarosite precipitation or precipitation of the other satisfactory but less desirable iron compound. Heating ordinarily extends through a period of two hours.

It is desirable to use only the minimum amount of liquid required to effectively leach the ore material and solubilize the metal values thereof.

Whereas this invention is here illustrated and described with respect to certain preferred procedures, it is to be understood that many variations are possible without departing from the inventive concepts particularly pointed out in the claims.

We claim:

1. A nitric acid process for recovering metal values from sulfide ore materials containing sulfide iron and values of one or more of the group of metals consisting of copper, nickel, cobalt, and silver, comprising subjecting such an ore material to the leaching action of an aqueous solution of nitric acid, the relative quantities of said ore material and of nitric acid in said solution being such that the pH of the pregnant leach solution rises from a pH of less than 0.5 during the course of the leaching operation, through pH 0.5 as the nitric acid is consumed, to a pH short of hydrolysis of the metal value or values to be recovered, and there being sufficient sulfate in the leach solution to supply the stoichiometric requirements for the formation of a jarosite or of an iron compound having the formula $2Fe_2O_3 \cdot SO_3 \cdot 5H_2O$; treating said pregnant leach solution to separate residue solids therefrom, said residue solids containing elemental sulfur and precipitated iron values in the form of jarosite or of an iron compound having the formula $2Fe_2O_3 \cdot SO_3 \cdot 5H_2O$; and then treating the separated solution to recover metal values contained therein.

2. A process in accordance with claim 1, wherein the nitric acid leach is carried out at slurry temperature within the range of from about 65° up to the boiling point.

3. A process in accordance with claim 2, wherein the slurry temperature during the addition of nitric acid is maintained at about 90° C.

4. A process in accordance with claim 1, wherein solids comprise from about 37% to about 50% by weight of the leach slurry.

5. A process in accordance with claim 1, wherein nitric acid leach solution is added gradually to an aqueous slurry of the ore material during an initial part of the leach period.

6. A process in accordance with claim 5, wherein the initial part of the leach period is about one-third of the total leach period.

7. A process in accordance with claim 6, wherein the leach period includes a terminal portion following nitric acid reaction during which the slurry is heated to an elevated temperature.

8. A process in accordance with claim 6, wherein the elevated temperature is just short of the boiling point of the leach slurry.

9. A process in accordance with claim 6, wherein the terminal portion of the leach period has a duration of about two hours.

10. A process in accordance with claim 1, wherein the leaching is conducted at above atmospheric pressure.

11. A process in accordance with claim 1, wherein the residue solids are treated for the removal of elemental sulfur, and are then subjected to froth flotation for the recovery of unreacted metal sulfides.

12. A process in accordance with claim 11, wherein the unreacted metal sulfides recovered by froth flotation are recycled to the nitric acid leach.

13. A process in accordance with claim 12, wherein the unreacted metal sulfides recovered by froth flotation are subjected to a size reduction operation prior to recycling.

14. A process in accordance with claim 11, wherein tailings from the froth flotation are processed for the recovery of values contained therein.

15. A process in accordance with claim 1, wherein at least a portion of the relatively barren liquid product resulting from the recovery of said metal values from said separated solution is recycled to the nitric acid leach.

16. A process in accordance with claim 15, wherein the barren liquid product is subjected to concentration prior to recycling.

References Cited

UNITED STATES PATENTS

| | | | |
|---|---|---|---|
| 1,244,810 | 10/1917 | Westley | 423—150 |
| 3,232,744 | 2/1966 | Munckata et al. | 423—150 |
| 2,431,997 | 12/1947 | DuRose | 423—150 |
| 3,656,937 | 4/1972 | Gandon et al. | 75—101 R |

HERBERT T. CARTER, Primary Examiner

U.S. Cl. X.R.

423—41, 141, 143, 145, 567; 75—101 R, 117, 118, 119